May 10, 1927.

D. H. NASH 1,627,616

SPEEDOMETER DRIVE

Filed Sept. 28, 1925    2 Sheets-Sheet 1

Inventor

David H. Nash,

WITNESS:—
Chas. L. Griesbauer

By Hubard & Hubard
Attorneys

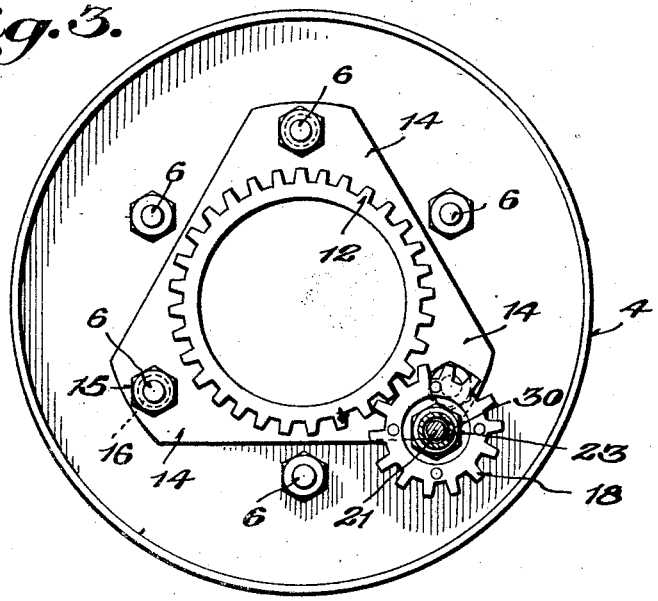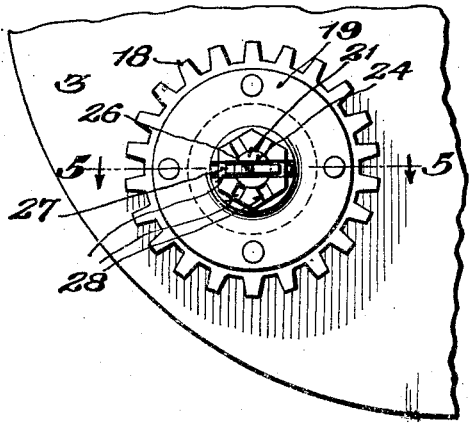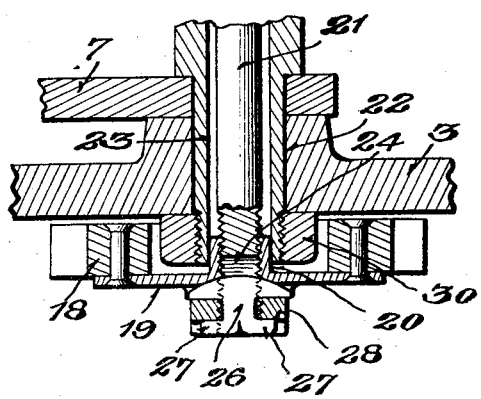

Patented May 10, 1927.

1,627,616

UNITED STATES PATENT OFFICE.

DAVID H. NASH, OF PETERSBURG, VIRGINIA.

SPEEDOMETER DRIVE.

Application filed September 28, 1925. Serial No. 59,217.

This invention is a drive for speedometers and its prime object is to provide for driving a speedometer through one of the rear wheels of the automobile whereby the universal joints commonly employed may be obviated.

A further object of the invention is to embody the same in the form of an attachment capable of being readily applied to an automobile without any material alterations in the standard parts thereof.

The invention will be illustrated and described in connection with a Ford automobile, but it will of course be understood that it may be applied to other makes of automobiles.

With these and other objects in view, the present invention consists in the combination and arrangement of parts, as will be hereinafter more fully described, illustrated in the accompanying drawings, and particularly pointed out in the appended claims, it of course being understood that changes in the form, proportion, size and minor details may be made, within the scope of the claims and without departing from the spirit or sacrificing any of the advantages of the invention.

In the drawings:

Figure 3 is a sectional view on the line 3—3 of Fig. 2 and on a reduced scale;

Figure 4 is an enlarged detail side elevation of the driven pinion of the present invention; and Figure 5 is a detail enlarged sectional view on the line 5—5 of Fig. 4.

Figure 1:
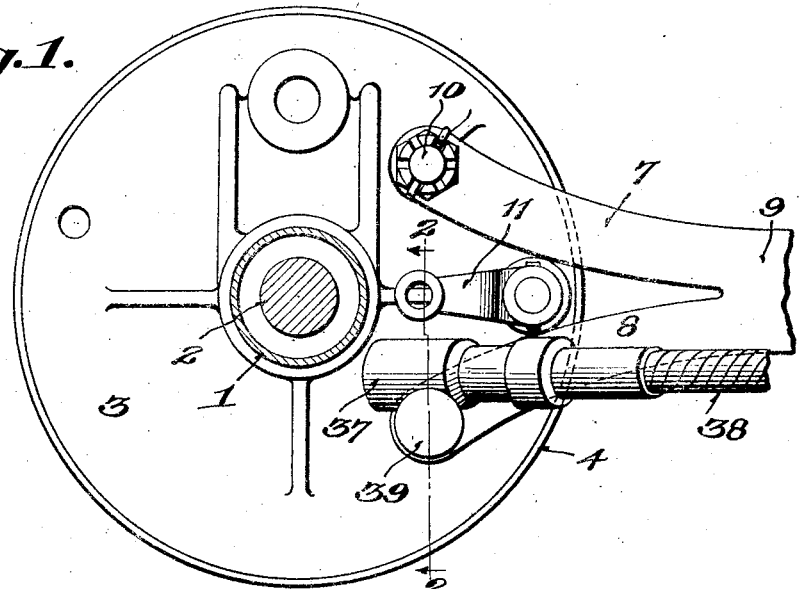
Figure 1 is a side elevation partly in section showing the application of the present invention to the rear end of a Ford automobile.

In Figure 1 of the drawings, there has been illustrated a portion of the rear end of a Ford automobile including the usual rear axle casing 1, housing the axle 2 and provided at each end with a cylindrical head or plate 3 which fits within the brake drum 4 that is secured to the adjacent rear wheel 5 in the usual manner, as by bolts 6. The axle casing is supported in the usual manner upon the fork members 7 and 8 of a rear radius bar 9, each fork member being bolted to the head 3 in the usual manner, one of such bolts being shown at 10 in Fig. 1 of the drawings. In Fig. 1 of the drawings, the reference character 11 designates a crank arm as commonly employed for the actuation of the inner brake band, normally contained within the brake drum 4, but which has been omitted from the present drawings. The parts thus described are the common and well known parts of a Ford automobile, and are the parts upon which the drive connection of the present invention is mounted.

Figure 2:
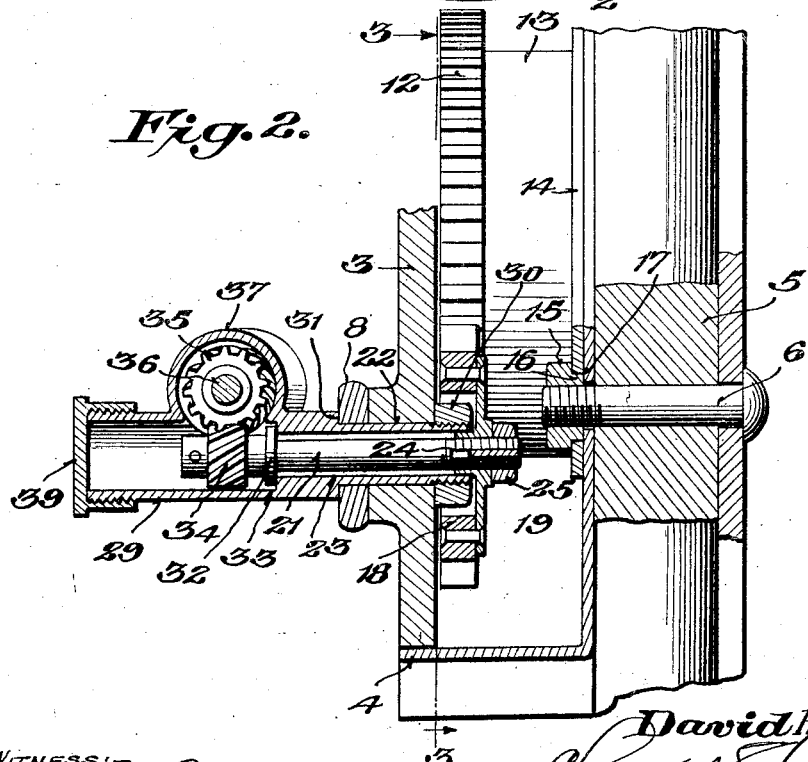
Figure 2 is an enlarged detail sectional view on the line 2—2 of Fig. 1.

In carrying out the present invention, I provide an externally toothed gear ring 12 which has a laterally projecting circumferential flange 13, which is provided at its outer end with attaching flanges 14 lying flat against the inner side of the back of the brake drum 4 and secured thereagainst by certain of the bolts 6 which secure the brake drum to the wheel. As best shown in Fig. 2, it will be seen that this arrangement spaces the toothed gear portion 12 from the back of the brake drum so as to accommodate the mechanism which is mounted within the brake drum for actuating the internal brake band.

Each nut 15, employed for holding the gear 12 in place, is provided with a cylindrical neck portion 16 received within an opening 17 in the flange 14 so as to reduce the amount of projection of the nut 15 and the bolt 16 within the brake drum.

For transmitting rotary motion from the gear 12, which is carried by and rotates with the rear wheel, there is provided a ring pinion 18, preferably of fiber, which is in mesh with the gear 12 and carried by a metallic plate 19 having a central opening and a hollow internally threaded stud or boss 20 which is screwed upon the inner end of a rotatable shaft 21 that extends horizontally outward through an opening 22 in the stationary head 3 and also through an opening 23 in the arm 8 of the rear radius bar. The inner end of the shaft 21 is bifurcated as at 24, and this bifurcated end projects beyond the plate 19 of the pinion 18 and is engaged by a nut 25, which is locked in place by a T-shaped key 26, the outer end of which is split and turned in opposite directions, as at 27, into suitable seats or notches 28 in the nut so as to lock the latter and prevent it from turning on the shaft 21. The shaft 21 rotates within a tubular casing 29, the inner reduced end of which extends through the openings 22 and 23 in the stationary head 2 and the radius bar portion 8, respectively. The inner end of the casing 29 projects into the ring pinion 18 and is screw threaded to receive a nut 30 which bears against the inner face of the stationary head 3. The casing 29 is provided with an external annular shoulder 31 bearing against the outer face of the radius bar portion 8 and is clamped thereagainst by means of the nut 30 to rigidly support the casing in place upon the stationary head 3. The shaft 21 is provided with an external annular shoulder or flange 32 which abuts against an internal annular shoulder 33 within the casing 29 to hold the shaft 21 against displacement inwardly towards the wheel. Outwardly beyond the annular shoulder 32, the shaft 21 is provided with a worm gear 34 in mesh with another worm gear 35 carried by a shaft 36 housed within a casing portion 37 provided upon the casing 29. The shaft 36 is connected with a flexible shafting 38, the latter being shown in Fig. 1 of the drawings, and which flexible shafting extends forwardly and transfers motion to any common or preferred form of speedometer mounted upon the instrument board of the automobile, as is usual with such instruments. The outer open end of the casing 29 is closed by a screw cap 39, whereby lubricant may be conveniently supplied to the interior of the casing 29 so as to maintain the worm gears 34 and 35 and the shaft 21 in a properly lubricated condition.

From the foregoing description, it will be understood that the driving gear 12 is rigidly mounted within and upon the brake drum 4 in a very simple and convenient manner without interfering with the usual brake band actuating means ordinarily contained within the brake drum. The pinion 18 is also mounted in a manner not to interfere with the brake band operating mechanism, and the remaining parts of the device transfer rotary motion from the wheel to the flexible shafting 38 in a very simple and efficient manner.

The mounting of the present invention is accomplished without material change in the standard parts of the Ford automobile, the casing 29 and the shaft 21 occupying the openings in the radius bar portion 8 and the fixed head 3 normally occupied by the bolt which secures the radius bar portion 8 to the head 3. By mounting the drive connections on the rear end of the automobile and driving directly from one of the rear wheels, universal joints may be dispensed with, as the rear wheel of the automobile always occupies the same angular relation with respect to the driving parts of the present invention.

By locating the gears 12 and 18 within the brake drum, they are housed and protected against dirt, sand and the effects of the weather.

What is claimed is:

1. In combination with a vehicle having a wheel, a dead axle, a brake-drum carried by said wheel, and a plate carried by said axle and closing the inner side of said brake-drum; a driving gear fixed to said wheel within the brake-drum; a driven gear enclosed within the brake-drum and meshing with the driving gear; a gear-housing supported by said plate; and angle-gearing, in said housing, connected with and actuated by said driven gear and adapted for connection with an instrument to be driven.

2. In combination with a vehicle having a rear wheel, a rear dead axle, a brake-drum carried by said wheel, and a plate carried by said axle, closing the inner side of said brake-drum and provided with a perforation; a driving gear fixed to said wheel within the brake-drum; a driven gear, within the brake-drum, meshing with the driving gear; a drive-shaft, on which the driven gear is mounted, extending outwardly through said perforation in said plate; a driven shaft outside the brake-drum; angle gearing connecting said shafts; and a gear-housing enclosing the gears provided with a bearing for the driven shaft and with a portion projecting inwardly through the perforation in said plate and constituting a bearing for the drive-shaft.

DAVID H. NASH.